March 1, 1949.　　　　F. P. LYONS　　　　2,463,401
APPARATUS FOR TRANSFER MOLDING
Filed Feb. 26, 1946　　　　　　　　　　　2 Sheets-Sheet 1

INVENTOR
F. P. LYONS
BY
ATTORNEY

March 1, 1949.  F. P. LYONS  2,463,401
APPARATUS FOR TRANSFER MOLDING
Filed Feb. 26, 1946  2 Sheets-Sheet 2
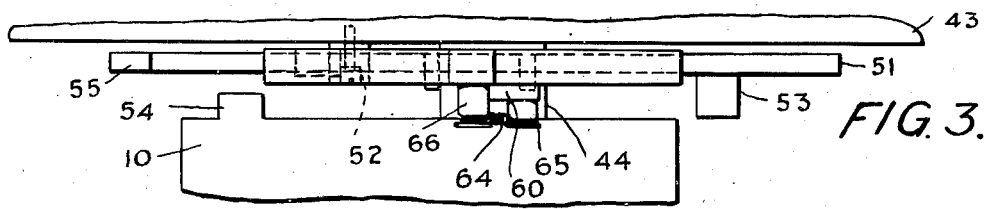
FIG. 3.
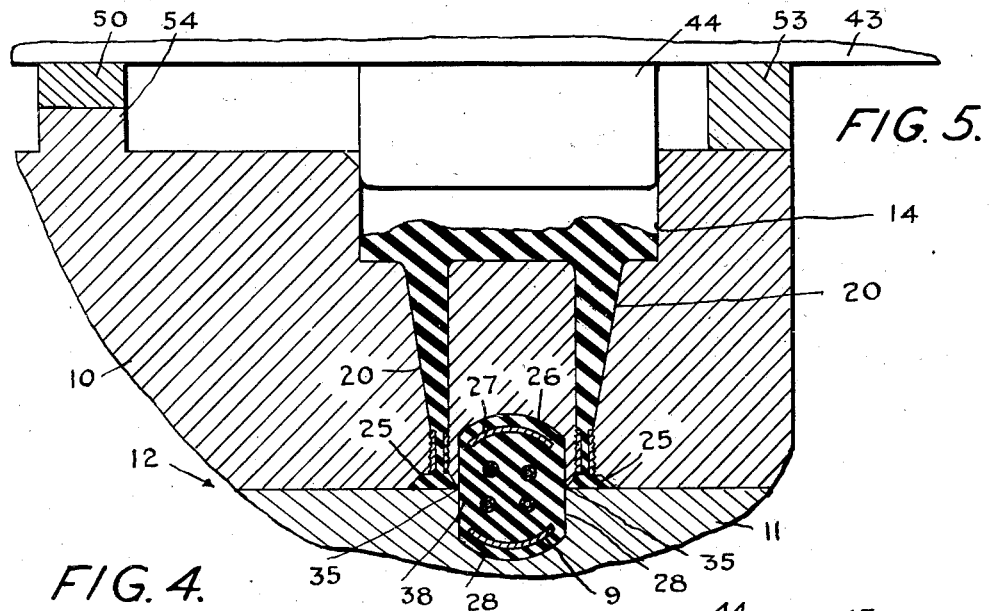
FIG. 5.
FIG. 4.
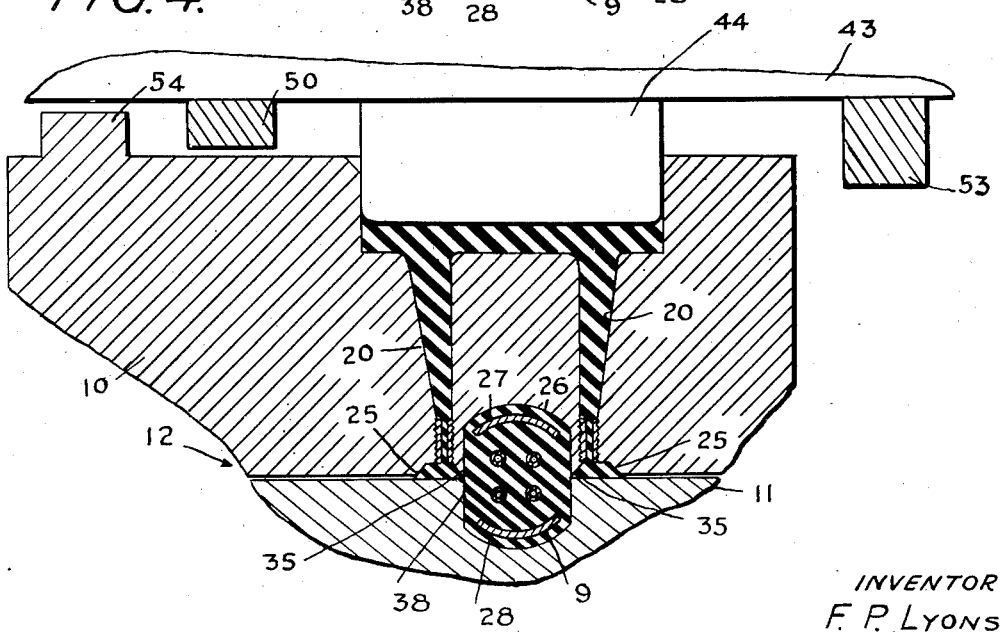
INVENTOR
F. P. LYONS.
BY
ATTORNEY Patented Mar. 1, 1949

2,463,401

UNITED STATES PATENT OFFICE 2,463,401

APPARATUS FOR TRANSFER MOLDING

Francis P. Lyons, Baltimore, Md., assignor to Western Electric Company, Incorporated, New York, N. Y., a corporation of New York Application February 26, 1946, Serial No. 650,191

5 Claims. (Cl. 18—30)

This invention relates to apparatus for molding articles, and particularly to apparatus for molding cable terminals.

In molding a vulcanizable plastic material, such as a hot rubber or rubber-like compound, around a flexible insert positioned in a mold cavity of a mold, sometimes the material is extruded into a mold cavity, the material is cooled and the molded article is removed from the cavity prior to the vulcanization thereof. Such operations are designated "prevulcanization molding." In previously known methods and apparatus, mold sections forming a mold are held tightly together and molding material is extruded into a mold cavity through extrusion passages leading to the mold cavity. As a result, high pressure zones are formed in the molded material adjacent to the outlet ends of the extrusion passages, in which the pressures are higher than those on the portions of the molding material in the mold cavity which are not adjacent to the outlets of the extrusion passages. When the molded article is removed from the mold so that the pressure on the molded material is relieved, the portions of the molded material under the higher pressures swell and form lumps on the periphery of the molded article. Also, since the molded material is not permanently set before it is taken out of the mold, the molded material swells somewhat as the pressure thereon is relieved.

An object of the invention is to provide new and improved methods of and apparatus for molding articles.

A further object of the invention is to provide new and improved apparatus for molding material around a skeleton terminal of a cable so as to eliminate all lumps on the periphery of the molded article.

In practicing the invention in accordance with one embodiment of the invention, a skeleton cable terminal on the end of a cable is placed in an elongated mold cavity formed in a pair of separable mold sections. One of the mold sections has an extrusion chamber therein which is connected by extrusion passages to the mold cavity. A plunger mounted in a fixed relationship with respect to a movable platen is designed to enter the extrusion chamber and force heated molding material through the passages into the mold cavity, while the movable platen does not force the mold sections together so that they are free to separate. The plunger and the movable platen are retracted from the mold sections and spacers are placed between the mold section having the extrusion chamber therein and the movable platen. The movable platen and the plunger then are forced toward the mold sections and the movable platen engages the spacers and forces the mold sections tightly together through the spacers, and the spacers prevent the plunger from entering the extrusion chamber far enough to engage the molding material therein so that it does not apply any pressure to the molding material when the mold sections are forced together, and all high pressure areas in the molding material are removed therefrom so that they do not swell when it is removed from the mold.

A complete understanding of the invention may be obtained from the following detailed description of a method and apparatus forming specific embodiments thereof, when read in conjunction with the appended drawings, in which, Fig. 1 is a side elevation of an apparatus forming one embodiment of the invention;

Fig. 3 is an enlarged, vertical section taken along line 3—3 of Fig. 2;

Fig. 4 is an enlarged, vertical section taken along line 4—4 of Fig. 2, and

Fig. 5 is an enlarged, vertical section similar to Fig. 4.

Figure 1:
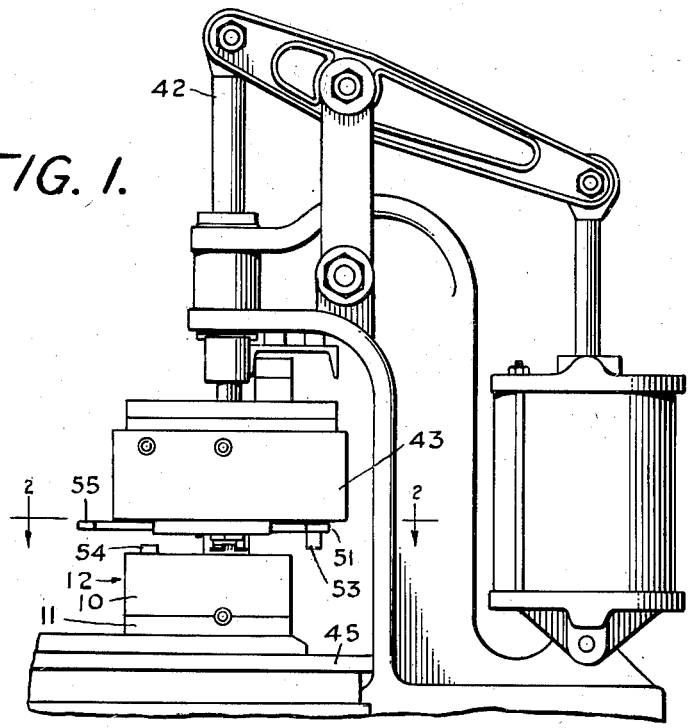

Referring now in detail to the drawings, Figs. 1 to 5, inclusive, illustrate a molding apparatus embodying the invention, which is designed to mold insulating material around a skeleton cable terminal 9 (Fig. 4). This apparatus comprises an upper mold section 10 and a lower mold section 11 of a mold 12, which is designed to mold a mass of vulcanizable material 18, such as a rubber or a rubber-like insulating compound, around the skeleton terminal. The upper mold section includes an extrusion chamber 14 and sprues 20—20 (Fig. 2), which lead from the bottom of the extrusion chamber to the bottom of the upper mold section. The sprues connect the extrusion chamber to channels 25—25 extending along opposite sides of a mold cavity 26 formed by a mold recess 27 formed in the upper mold section 10 and a mold recess 28 formed in the lower mold section 11. The channels 25—25 are positioned directly below the outlets of the sprues 20—20, and elongated lands 35—35 are spaced a short distance from the top of the lower mold section to form therewith line-like extrusion passages 38—38 extending along opposite sides of the mold cavity.

The mold sections 10 and 11 are used in conjunction with a molding press (Fig. 1) provided with a ram 42, on which is mounted rigidly a heated movable platen 43 from which a plunger 44 (Figs. 4 and 5) projects a predetermined distance. The plunger 44 is designed to enter the extrusion chamber 14 formed in the upper mold section 10 to force the molding material 18 out of the extrusion chamber through the sprues 20—20. The molding press is also provided with a heated stationary platen 45 for supporting and heating the mold during the molding operation.

Figure 2:
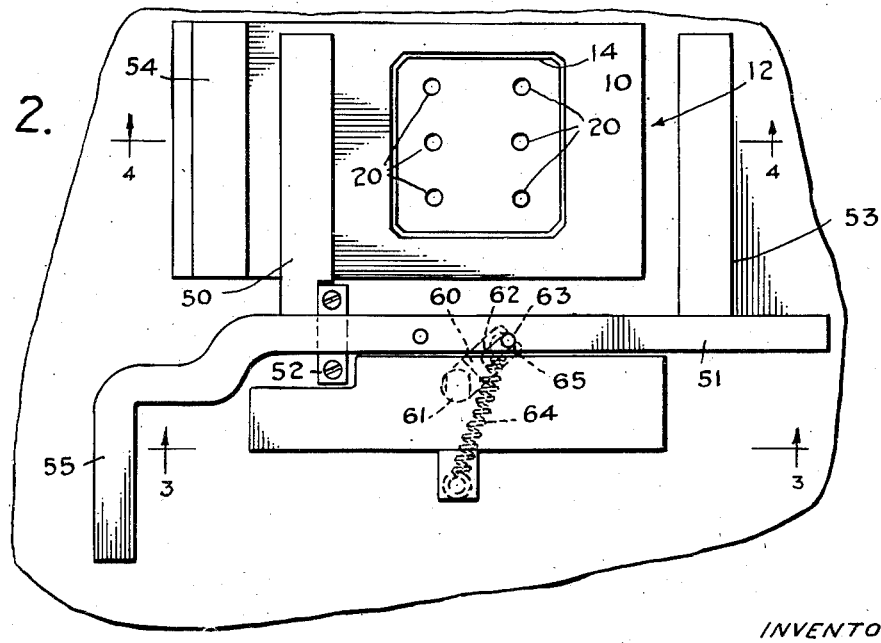
Fig. 2 is a horizontal section taken along line 2—2 of Fig. 1.

A thin spacer 50 (Figs. 2, 4 and 5) is fastened rigidly to a bar 51, which is mounted slidably on the lower face of the movable platen, as viewed in Fig. 1, by a bracket 52 (Fig. 2). A thick spacer 53 is rigidly secured to the rod 51 and is positioned on the opposite side of the extrusion chamber from that on which the thin spacer 50 is positioned. A bar 54 is formed on the upper surface of the mold section 10 at the side of the extrusion chamber 14 at which the thin spacer 50 is positioned. The thickness of the spacer 50 and that of the bar 54 are substantially equal and their combined thicknesses are exactly equal to the thickness of the thick spacer 53.

A handle 55 formed on the rod 50 may be actuated to slide the rod 50 along the movable platen to position the thin spacer 50 directly over the bar 54 and the thick spacer 53 directly over the upper mold section, as shown in Fig. 5. The rod 51 (Fig. 2) also may be moved from this position in which the thin spacer 50 clears the bar 54 and the thick spacer 53 clears the upper mold section 10, as shown in Fig. 4. A link 60 (Figs. 2 and 3) is mounted pivotally on the movable platen 43 by a pin 61. The free end of the link has a solt 62 formed therein, in which a pin 63 fastened to the rod 51 is slidable. A tension spring 64 is fastened to a pin 65 secured to the free end of the link and to a pin 66 fastened to the movable platen. The tension spring, the slotted link and the pins 61, 63, 65 and 66 form an overcenter latch and maintain the rod 51 and the spacers 50 and 53 either in positions in which the spacer is directly over the bar 54 on the upper mold section 10 and the spacer 53 is directly over the upper mold section, or in positions in which the spacer 50 completely clears the bar 54 and the spacer 53 completely clears the mold section 10.

In the molding operation, the mold sections 10 and 11 of the mold 12 are opened, the skeleton cable terminal 9 is placed in the mold recess 28 formed in the lower mold section 11, and the mold sections are closed. The molding material 18 is placed in the extrusion chamber 14 formed in the upper mold section 10, and the mold 12 is positioned in the press in the position shown in Fig. 1. The heated platens 43 and 45 maintain the mold 12 at a temperature high enough to soften the molding material 18 but low enough that the material is not cured during the time it is in the mold.

The rod 51 (Fig. 2) is moved to the position in which it is shown in Fig. 2, which moves the thin spacer 50 completely clear of the bar 54 and moves the thick spacer 53 completely beyond the mold section 10. The movable platen 43 and the plunger 44 are then forced downwardly and the plunger enters the extrusion chamber 14. The plunger 44 forces the molding material 18 through the sprues 20—20 into the channels 25—25 and through the extrusion passages 38—38 into the mold cavity 26, as shown in Fig. 4. The quantity of molding material placed in the extrusion chamber and the depth which the plunger enters the extrusion chamber are such that the material 18 overfills the mold cavity and forces the mold sections 10 and 11 slightly apart.

The mold sections may be separated slightly since the plunger 44 projects beyond the thin spacer 50 a distance sufficient that the thin spacer 50 does not contact the upper mold section 10, the bar 54 does not contact the movable platen during the extrusion operation, and the thick spacer 53 is positioned completely to one side of the mold section 10 so that it does not force the mold sections together. At this time the portions of the molding material 18 in the portions of the mold cavity immediately adjacent to the extrusion passages are under higher pressures than the rest of the molding material in the mold cavity, and if the molded article were removed from the mold, peripheral lumps or bulges would be formed from the portions of the molding material under higher pressure than that on the rest of the material in the mold cavity.

The movable platen 43 and the plunger 44 then are lifted upwardly away from the mold, the thin spacer 50 is slid to the left, as viewed in Fig. 4, to a position directly over the bar 54 formed on the upper mold section 10, and the thick spacer 53 is slid simultaneously to a position over the upper mold section 10. The movable platen 43 and the plunger 44 are pressed downwardly again, whereupon the thin spacer 50 engages the spacer bar 54, the thick spacer 53 engages the upper mold section 10, and the plunger 44 enters the extrusion chamber 14 a short distance. However, the downward movement of the plunger is limited sufficiently that it does not contact the molding material 18 left in the extrusion chamber. The spacers 50 and 53 transmit force from the movable platen to the upper mold section, and force the mold sections tightly together. This forces any excessive material in the mold cavity back into the channels 25—25 and from the channels into the sprues 20—20 and into the extrusion chamber. Since the plunger 44 does not contact the molding material 18 in the extrusion chamber, the pressure on the molding material in the mold is equalized in all portions thereof.

The movable platen 43, the plunger 44, the thin spacer 50 and the thick spacer 53 then are moved away from the mold and the mold is moved out of the press after which the mold is opened, and the molded article is removed from the mold. The molded article now has no lumps thereon. The above-described operation then is repeated to mold material around another skeleton terminal.

Each entire molding cycle is accomplished in a very short time and the heat of the mold 12 is low enough that the molding material left in the extrusion chamber 14, the sprues 20—20 and the channels 25—25 is not cured. Hence, this residue of the molding material need not be cleaned from the mold and thus wasted but is used to cover the next skeleton terminal. The volume of the extrusion chamber is large enough with respect to the volume of molding material needed for each molding operation that the residue of the molding material left in the extrusion chamber is sufficient to provide for the next molding operation. Thus, cold slabs of molding material may be placed on top of the residue in the extrusion chamber and may be used to force the residue into the mold cavity during the next molding operation. The freshly added material will be heated by the mold during that molding operation so that it will be softened, and will flow easily during the molding operation succeeding the last-mentioned one. Thus, no preheating of the molding material is needed.

After the material 18 is molded around the skeleton terminal 9, it is covered with strips of jacketing compound (not shown), such as a rubber or a rubber-like compound, which strips may be easily positioned around the periphery of the molded article without air voids therebetween, which air voids might be caused if there were lumps of the material projecting from the periphery thereof. Such lumps are present where prevulcanization molding is accomplished without relief of higher pressures in the molding material prior to the removal of the molded article from the mold cavity 26. Such lumps, in addition to causing voids in the jacketing material, also cause the jacketing material to be too thin in spots.

In the prevulcanization molding described hereinabove, the mold cavity is overfilled with molding material under pressure, then the pressure on the molding material is relieved and the excess molding material is forced out of mold cavity. Hence, no lumps are formed in the extruded product and the strips of jacketing compound may be molded therearound in a manner such as to prevent air voids therebetween. The mold described hereinabove obviously may be used to vulcanize the molding material 18, if it is deemed necessary, and may be used to mold any thermoplastic materials or any thermosetting materials.

What is claimed is:

1. An apparatus for molding articles, which comprises a pair of freely separable mold sections having a mold cavity formed therein, one of said mold sections being provided with an extrusion chamber connected with the mold cavity, a movable platen, a plunger projecting therefrom, means for moving the platen toward the mold sections and the plunger into the extrusion chamber to force plastic material under pressure from the extrusion chamber into the mold cavity and for moving the platen away from the mold sections and the plunger out of the extrusion chamber to relieve the pressure on the material therein, said plunger projecting from the platen a sufficient distance that the platen does not contact the mold sections while the plunger forces material from the extrusion chamber, and a pressure-transmitting member carried by the platen and selectively movable to a position between the platen and the mold section having the extrusion chamber therein for pressing the mold sections tightly together after the pressure on the material has been relieved and for preventing the plunger from applying pressure to the material in the extrusion chamber.

2. An apparatus for molding articles, which comprises a pair of separable mold sections cooperating to form a mold cavity, one of said mold sections being provided with an extrusion chamber and a plurality of sprues for connecting the extrusion chamber to the mold cavity, a movable platen, a plunger projecting from the movable platen a distance sufficient to force plastic material from the extrusion chamber under pressure into the mold cavity without contact between the platen and the last-mentioned mold section, and means selectively insertable between the platen and the last-mentioned mold sections for transmitting force from the platen to that mold section, said means serving to prevent the application of pressure to the material by the plunger when it is inserted between the platen and the last-mentioned mold section.

3. An apparatus for molding articles, which comrises a pair of freely separable mold sections having a mold cavity therein, one of said mold sections also being provided with an extrusion chamber and a plurality of passages for connecting the extrusion chamber to the mold cavity, a platen, means for effecting relative movement between the platen and the mold sections, a plunger projecting from the platen a distance sufficient to force plastic material under pressure from the extrusion chamber in the mold section into the mold cavity without contact between the platen and the last-mentioned mold section, spacing means carried by the platen and selectively insertable between the platen and the last-mentioned mold section for transmitting force from the platen to that mold section, said spacing means being of a thickness sufficient to prevent the application of pressure to the material by the plunger when the spacing means is inserted between the platen and the last-mentioned mold section, and means for latching the spacing means in a position between the platen and the last-mentioned mold section.

4. An apparatus for molding articles, which comprises a pair of freely separable mold sections having a mold cavity therein, one of said mold sections being provided with an extrusion chamber and a plurality of passages for connecting the extrusion chamber to the mold cavity, a movable platen, means for moving the platen toward and away from the mold section having the extrusion chamber, a plunger projecting from the movable platen a distance sufficient to force under pressure plastic material from the extrusion chamber into the mold cavity without contact between the platen and the last-mentioned mold section, and a block mounted slidably on the platen for selective movement to a position between the platen and the last-mentioned mold section for transmitting force from the platen to that mold section, said block being of a thickness sufficient to prevent the application of pressure to the material in the extrusion chamber by the plunger when the block is inserted between the platen and the last-mentioned mold section.

5. An apparatus for molding articles, which comprises a pair of freely separable mold sections having a mold cavity therein, one of said mold sections being provided with an extrusion chamber and a plurality of passages for connecting the extrusion chamber to the mold cavity, said last-mentioned mold section also being provided with a block of a predetermined thickness projecting therefrom in a position at one side of the extrusion chamber, a movable platen, means for reciprocating the platen toward and away from the last-mentioned mold section, a plunger projecting from the movable platen a distance sufficient to force under pressure plastic material from the extrusion chamber into the mold cavity without contact between the platen and the block, a frame mounted on and slidable with respect to the platen, a second block of a thickness not greater than that of the first block and movable by the frame between a position between the platen and the last-mentioned mold section but offset from the first block to a position in alignment with the first block, a third block having a thickness equal to the combined thickness of the first block and the second block and movable by the frame from a position at one side of the last-mentioned mold section between that mold section and the platen when the second block is moved into alignment with the first block, the thickness of the third block and the combined thickness of the first block and the second block each being sufficient to prevent the application of pressure to the material by the plunger when the second block is positioned in alignment with the first block and the third block is inserted between the platen and the last-mentioned mold section, and means for latching the frame in predetermined positions with respect to the platen.

FRANCIS P. LYONS.

REFERENCES CITED

The following references are of record in the file of this patent:

UNITED STATES PATENTS

| Number | Name | Date |
| --- | --- | --- |
| 1,997,074 | Novotny | Apr. 9, 1935 |
| 2,355,613 | Wacker | Aug. 15, 1944 |

Certificate of Correction

Patent No. 2,463,401.                                                                         March 1, 1949.

FRANCIS P. LYONS

It is hereby certified that errors appear in the printed specification of the above numbered patent requiring correction as follows:

Column 3, line 29, before the word "in" insert *to a position*; line 34, for "solt" read *slot*; column 6, line 4, for "comrises" read *comprises*; and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*